United States Patent
Nissani (Nissensohn)

(10) Patent No.: US 7,260,153 B2
(45) Date of Patent: Aug. 21, 2007

(54) MULTI INPUT MULTI OUTPUT WIRELESS COMMUNICATION METHOD AND APPARATUS PROVIDING EXTENDED RANGE AND EXTENDED RATE ACROSS IMPERFECTLY ESTIMATED CHANNELS

(75) Inventor: Daniel Nathan Nissani (Nissensohn), Tel Aviv (IL)

(73) Assignee: MIMOpro Ltd., RaAnana (IL)

( * ) Notice: Subject to any disclaimer, the term of this patent is extended or adjusted under 35 U.S.C. 154(b) by 725 days.

(21) Appl. No.: 10/423,447

(22) Filed: Apr. 28, 2003

(65) Prior Publication Data

US 2004/0047426 A1 Mar. 11, 2004

Related U.S. Application Data

(60) Provisional application No. 60/429,018, filed on Nov. 26, 2002, provisional application No. 60/419,306, filed on Oct. 18, 2002, provisional application No. 60/409,048, filed on Sep. 9, 2002.

(51) Int. Cl.
*H04L 27/00* (2006.01)

(52) U.S. Cl. ............... 375/259; 375/295; 375/347; 375/349; 375/296; 455/450; 455/562.1; 455/63.1; 455/69; 342/378

(58) Field of Classification Search ........... 375/267, 375/347, 285, 346
See application file for complete search history.

(56) References Cited

U.S. PATENT DOCUMENTS

| | | | | |
|---|---|---|---|---|
| 6,144,711 | A * | 11/2000 | Raleigh et al. | 375/347 |
| 6,314,147 | B1* | 11/2001 | Liang et al. | 375/346 |
| 6,760,388 | B2* | 7/2004 | Ketchum et al. | 375/295 |
| 6,834,109 | B1* | 12/2004 | Pare et al. | 379/416 |
| 6,862,271 | B2* | 3/2005 | Medvedev et al. | 370/329 |
| 6,987,819 | B2* | 1/2006 | Thomas et al. | 375/342 |
| 2002/0111142 | A1* | 8/2002 | Klimovitch | 455/63 |
| 2003/0003863 | A1* | 1/2003 | Thielecke et al. | 455/39 |
| 2003/0072380 | A1* | 4/2003 | Huang | 375/261 |
| 2003/0086514 | A1* | 5/2003 | Ginis et al. | 375/346 |
| 2003/0125040 | A1* | 7/2003 | Walton et al. | 455/454 |
| 2003/0223516 | A1* | 12/2003 | Zhang et al. | 375/346 |

* cited by examiner

*Primary Examiner*—Chieh M. Fan
*Assistant Examiner*—Siu M. Lee

(57) ABSTRACT

A Multi Input Multi Output (MIMO) Wireless Communication System method and apparatus are proposed whereby in a 2-way wireless communication system with scattering, random and imperfectly estimated propagation channels the ubiquitous and inherent MIMO cross-talk interference problem is solved so that robust and predictable Extended Communication Range and Extended Data Rate are achieved.

41 Claims, 4 Drawing Sheets

MULTI INPUT MULTI OUTPUT WIRELESS COMMUNICATION METHOD AND APPARATUS PROVIDING EXTENDED RANGE AND EXTENDED RATE ACROSS IMPERFECTLY ESTIMATED CHANNELS

CROSS REFERENCE TO RELATED APPLICATIONS

This application claims the benefit of the following US PTO Provisional Applications:
a. Nissani (Nissensohn), D. N., 'Wireless Communication Multi Antenna Array Method and Apparatus providing Extended Range and Extended Rate across Random or Imperfectly Estimated Channels', U.S. PTO 60/409,048, filed Sep. 9, 2002
b. Nissani (Nissensohn), D. N., 'Channel Acquisition, Equalization and Processing Method and Apparatus for Multi Antenna Array Wireless Communication Systems', U.S. PTO 60/419306, filed Oct. 18, 2002
c. Nissani (Nissensohn), D. N., 'Multi Input Multi Output Wireless Communication Method and Apparatus providing Extended Range and Extended Rate across Imperfectly Estimated Channels', U.S. PTO 60/429018, filed Nov. 26, 2002

STATEMENT REGARDING FEDERALLY SPONSORED RESEARCH OR DEVELOPMENT

Not Applicable

CITED REFERENCES

The following references are cited within this invention description:
[1] Foschini, J. G., 'Wireless communications system having a layered space-time architecture employing multi-element antennas', U.S. Pat. No. 6,097,771
[2] Foschini, J. G., 'Wireless communications system having a space-time architecture employing multi-element antennas at both the transmitter and receiver', U.S. Pat. No. 6,317,466
[3] Telatar, E. I., 'Capacity of Multi-antenna Gaussian Channels', Technical Memorandum, Bell Laboratories, October 1995
[4] Nissani (Nissensohn), D. N, 'Multi Antenna Array Method and Apparatus providing unified Antenna Array Gain, Diversity Gain and Extended Data Rate in OFDM Communication Systems', U.S. PTO 60/401370, Jul. 20, 2002
[5] Proakis, J. G., 'Digital Communications', McGraw-Hill, 1995
[6] Van Trees, H., 'Detection, Estimation and Modulation Theory', Wiley, 1968
[7] Stewart, G. W., 'Perturbation Theory for the Singular Value Decomposition' UMIACS-TR-90-124, September 1990
[8] Duda, R. O., Hart, P. E., 'Pattern Classification and Scene Analysis', Wiley & Sons, 1973
[9] Gallager, R. G., 'Information Theory And Reliable Communication', MIT, 1968
[10] Paulraj, A. J., et al. 'Method and wireless systems using multiple antennas and adaptive control for maximizing a communication parameter', U.S. Pat. No. 6,351,499
[11] Nissani (Nissensohn), D. N., 'The MIMO cross-talk interference problem—a novel solution', internal Technical Report, March 2003

BACKGROUND OF THE INVENTION

This invention relates in general to Multi Input Multi Output (MIMO) 2-way Wireless Communication Systems. More specifically, this invention is related to MIMO 2-way Wireless Communication Systems where Multiple Antenna Arrays (MAA) are used in some of the system communication devices, where the propagation Channel Matrix is random, where Channel Information is available at both the Transmitter and Receiving sides, and where said propagation Channel Matrix information is imperfectly estimated.

During recent years Multi Input Multi Output (MIMO) schemes were proposed for Wireless Communication Systems whereby some of the system communication devices include Multiple Antenna Arrays (MAA) and associated transmission and reception circuitry. MIMO systems, when operated in richly scattering channels (such as typical urban and indoor channels in conjunction with properly designed antenna arrays) may exhibit antenna array gain, space diversity gain (and thus Extended Range), and, in certain cases, the ability to effectively multiply the overall data rate transferred thru the channel by means of splitting the data stream into several sub-streams, each transferred through one of a set of separate propagation channel 'modes' (and thus achieving Extended Rate). Note that while the term Extended Capacity could be used instead of both Extended Range/Rate (since range can be usually traded off by rate and vice-versa) we prefer the latter distinction along this text to distinguish between the 'conventional' array/diversity gains on one hand, and the ability to transmit several data sub-streams in parallel, which may be achieved only when the 2 communicating sides include an MAA, on the other.

In some of these schemes, relevant to this invention, the propagation complex Channel transfer Matrix H of R×L elements is estimated at one or both of the receiving sides during a Training Stage, where L and R denote the number of antennas and corresponding circuitry in the Left and Right side devices respectively (and usually L and/or R>1). A standard Singular Value Decomposition operation (usually denoted SVD in elementary matrix algebra texts) is subsequently conducted on this estimated channel matrix so that H=U D V' where U and V are R×R and L×L unitary matrices whose columns are the eigen-vectors of H H' and H'H respectively, D is an R×L diagonal matrix, and ( )' denotes the matrix conjugate transpose operator.

The diagonal elements Di of the matrix D, known as the Singular Values of H, are the (non-negative, real) square roots of the eigen-values of H' H, and, as such, are proportional to the gain of each of the channel H fore-mentioned parallel transmission 'modes'. In some of these same MAA schemes another diagonal real Power Allocation Matrix A is applied at the transmitting side to the data symbols vector s, prior to any other processing so that equal power is allocated to each of the user data sub-streams, or (other times) alternatively so that the data sub-stream components associated to channel 'modes' with more favorable gain (i.e. greater magnitude Singular Values) are allocated more power following the 'water pouring' algorithm described in e.g. [9], and vice-versa, and so that the overall transmitted power is constrained.

At the end of this Training Stage, information related to this channel matrix H (or to relevant parts of its SVD decomposition) resides at both Left and Right sides, the Transmitting side (say Left) applies the unitary complex matrix V as a transmission weight upon the transmitted vector sequence, and the Receiving side (say Right) applies the unitary complex matrix U' as its reception weight upon the received vector.

Summarizing in matrix notation the signal processing executed in some of these fore-mentioned schemes as described above, denoting by s the (usually complex) source data sub-stream vector (of dimension M≦min {L, R}), by x the complex base-band representation of the transmitted signal vector (of dimension L, assuming without loss of generality that Left is the Transmitting side), by y the complex base-band representation of the received signal vector (of dimension R, assuming Right is the Receiving side), by r the recovered data sub-stream complex vector, and neglecting the receiving circuitry (and possibly interference) noise, we have:

$x=VAs$ $y=Hx=(UDV')x=UDV'VAs$ $r=U'y=(U'U)D(V'V)A\ s=DAs$ Eq. 1 where we have exploited the fact that both U and V are unitary (U' U=I where I is the Identity matrix, etc.). Hence, since both D and A are diagonal, each element of r is a (scaled) version of a corresponding element of s, as required for perfect and simple data recovery.

Other MAA schemes, similar in purpose and nature, were also described (e.g. [4]) whereby the actual processing is conducted at the Frequency Domain, rather than the Time Domain, thus allowing optimization of the said Weighting Matrices to each useful bandwidth slot, for example each OFDM sub-carrier, as would be required in the presence of Frequency Selective Fading propagation channels.

Still other MIMO schemes, less relevant to the present invention but also similar in purpose were described (e.g. [1], [2]) whereby no Channel Matrix information is required at the transmitting side, whereby the propagation complex Channel transfer Matrix H of R×L elements is assumed to be known only at the Receiving side, and whereby the received data recovery is performed by means of applying specific solution methods to the Equation y=H x where y, H and x are as defined above.

It is generally implicitly assumed in these schemes that the propagation channel matrix H is perfectly estimated during a so called Channel Training (or Acquisition) Stage so that perfect information about the channel is available at the end of said Training Stage at the receiving and, (if required) the transmitting sides. It is also generally assumed that the channel matrix H elements are complex random variables and, as such, that the Singular Values of H are random variables as well. The processing nature of the for-mentioned Channel Matrix Acquisition Stage is generally ignored, in contrast with non-MIMO wireless communication systems where (Scalar) Channel initial estimation methods have been extensively studied and applied (e.g. [5]).

The assumption concerning perfect channel estimation is generally not valid. Typical propagation channels and receiving circuitry are noisy and the channel Training Stage is usually time limited. Since the channel matrix estimation error depends on both the channel measurements Signal to Noise Ratio (SNR) and on the number of measurements, the estimated result, denoted Hn is usually different from the actual channel matrix H, that is Hn=H+dH where dH is the estimation error. The Singular Value Decomposition of Hn is Un Dn Vn' where, again, the subscript n denotes the noisy version of the actual corresponding counterparts U D V' which were described above. Replacing in Equation 1 these noisy versions we get:

$r=Un'y=(Un'U)D(V'Vn)As$ Eq. 2 where we do not get the perfect signal recovery as described in Equation 1 since Un' U and V' Vn do not equal the Identity matrix anymore, so that the recovered data sub-stream elements of the vector s include cross-talk noise from the other sub-stream elements.

As predicted by Matrix Perturbation Theory (e.g. [7]), the achieved cross-talk SNR depends on the norm of the perturbation dH, which in our case depends on the channel measurements SNR and the number of measurements, as well as on certain relationships between the singular values of H, which are random in our case since the matrix H is assumed to be random.

In the context of the present invention it is also assumed that the Channel Matrix is relatively time invariant, that is only negligible changes in the matrix H occur during the duration of a transmission burst. This last assumption is reasonable when the relative motion between the communication devices is slow, such as in WLAN and Fixed Wireless Access Networks, or when the transmission bursts are of short duration (relative to the Doppler period), as is usually the case in Cellular Networks.

OBJECTIVES AND ADVANTAGES OF THE INVENTION

A main objective of the present invention is to propose a comprehensive Method and corresponding Apparatus by which Extended Range and Extended Rate robust and predictable communication performance can be achieved in Wireless MIMO Communication Systems with imperfect Channel Matrix estimation.

A second main objective of our present invention consists of the introduction and definition of a Channel Matrix Metrics to evaluate the level of for-mentioned cross-talk interference induced by different Channel Matrices.

A third main objective of our present invention consists of the introduction and application, in relation to the for-mentioned Channel Matrix Metrics, of Pre-Equalizer operators used to transform a Channel Matrix instance, with given Channel Matrix Metrics into another, prescribed, Channel Matrix with more favorable Channel Matrix Metrics, and of different possible strategies to prescribe such Pre-Equalizer operators.

A fourth main objective of the present invention consists of the introduction of the concept of 'Good' and 'Bad' channels, of corresponding Discriminating Functions, of Method and Apparatus required to classify said random instances of Channel Matrices as 'Good' or 'Bad', and of a Pre-Equalizer operator required to transform a said 'Bad' channel into a said 'Good' channel so that the loss incurred in said transformation is minimal.

A fifth main objective of our present invention consists of the introduction of the concept of net total (cross-talk and thermal) SNR gain and of Method and Apparatus required to solve for a modified channel with optimal said net total SNR gain and of a Pre-Equalizer operator required to transform an original channel into said optimal channel.

A sixth main objective of our present invention consists of the definition and characterization of a Post-Equalizer operator used to cancel residual sub-stream interference, and the Method and Apparatus required to calculate said Post-Equalizer and to apply it to the received signal.

A seventh main objective of our present invention consists of the characterization and definition of MIMO Training Matrices devised so that a given side device may initially estimate, or acquire, the radio waves propagation Channel Matrix and relevant information derived thereof between itself and the other side device for purpose of further being able to efficiently transmit to, or receive from, said other side device and the corresponding Method and Apparatus to achieve this.

A major advantage of the proposed invention is the significant user data Signal-to-Noise-Ratio (SNR) enhancement achieved, relative to systems not applying the methods described herein, with the immediate result of relative increase in communication system capacity and the derived range and user data rate.

Another advantage of the proposed invention is that it achieves the stated objectives with no major impact on communication device implementation complexity.

Still another advantage of the proposed invention is that it achieves the stated objectives with no increase in total transmitted power.

Still another advantage of the proposed invention is that other known techniques such as Adaptive Modulation and Interference Cancellation may be applied on top of the techniques introduced in this invention to further enhance communication performance Still another advantage of the present invention is that it is directly applicable both to MIMO Communication Systems whereby MAA Processing at the transmitting and receiving sides is applied at the time domain, as well as to MIMO Communication Systems whereby MAA Processing is applied at the frequency domain such as in OFDM MIMO Communication Systems (e.g. [4]).

Still other advantage of the proposed invention is that when an MAA device in which the current invention is implemented communicates with a (non MAA featured) Single Antenna device, then the MAA featured device transmitted signal does not differ in no modulation significant way from a signal transmitted by such a said Single Antenna device thus allowing compatible communication between MAA and Single Antenna devices.

SUMMARY OF THE INVENTION

The proposed invention comprises a 2-way Wireless Communication Network, said Network including at least 2 communication devices, at least one of said communication devices comprising a Multi Antenna Array (MAA) element with its associated transmitting, receiving and processing circuits.

While in the course of this invention description, by way of example and for the sake of clarity and brevity, a MIMO processing scheme based on the execution of said processing at the time domain, will be generally assumed, it is emphasized that this invention is directly applicable to other schemes as well, such as wherein the MIMO processing is executed at the frequency domain (such as in [4]).

In accordance with the principles of this invention a pre-set MIMO Training Matrix $S_0$ (MTM in short), known to all communicating devices is generated and transmitted by (say) the Left side device and received and processed by (say) the Right side device, in such a manner so that at the end of said processing by the Right side device a (naturally noisy but in some sense optimal) estimate Hn of the Channel Matrix H and associated modified channel Hm, Transmission Weighting Matrix V, Reception Weighting Matrix U, Power Allocation Matrix A, and Pre-Equalizer Matrix P are calculated, relevant parts of said Channel Matrix derived information subsequently transferred to the Left side device (by means of an implicit 'reverse' channel), or alternatively, said training process repeated from Right side to Left side so that, in any case, at the end of such process, the required Channel Matrix information derivations are available and allocated to each relevant side.

In further accordance with the principles of the present invention another pre-set MTM $S_1$, similarly known to all communicating devices is generated and transmitted by (say) the Left side device and received and processed by (say) the Right side device in such a manner so that at the end of said processing by the Right side device a Post-Equalizer Matrix Q is calculated and available at the Right side device.

As stated above our present invention consists of the characterization, definition, calculation and usage of these so called MIMO Training Matrices $S_0$ and $S_1$, Transmission Weighting Matrix V, Reception Weighting Matrix U, Pre-Equalizer Matrix P, Post-Equalizer Matrix Q, and Power Allocation Matrix A devised so that efficient user data transmission may take place between a Transmitting side device and a Receiving side device within a MIMO Wireless Communication System.

DETAILED DESCRIPTION OF THE INVENTION

Figure 1:
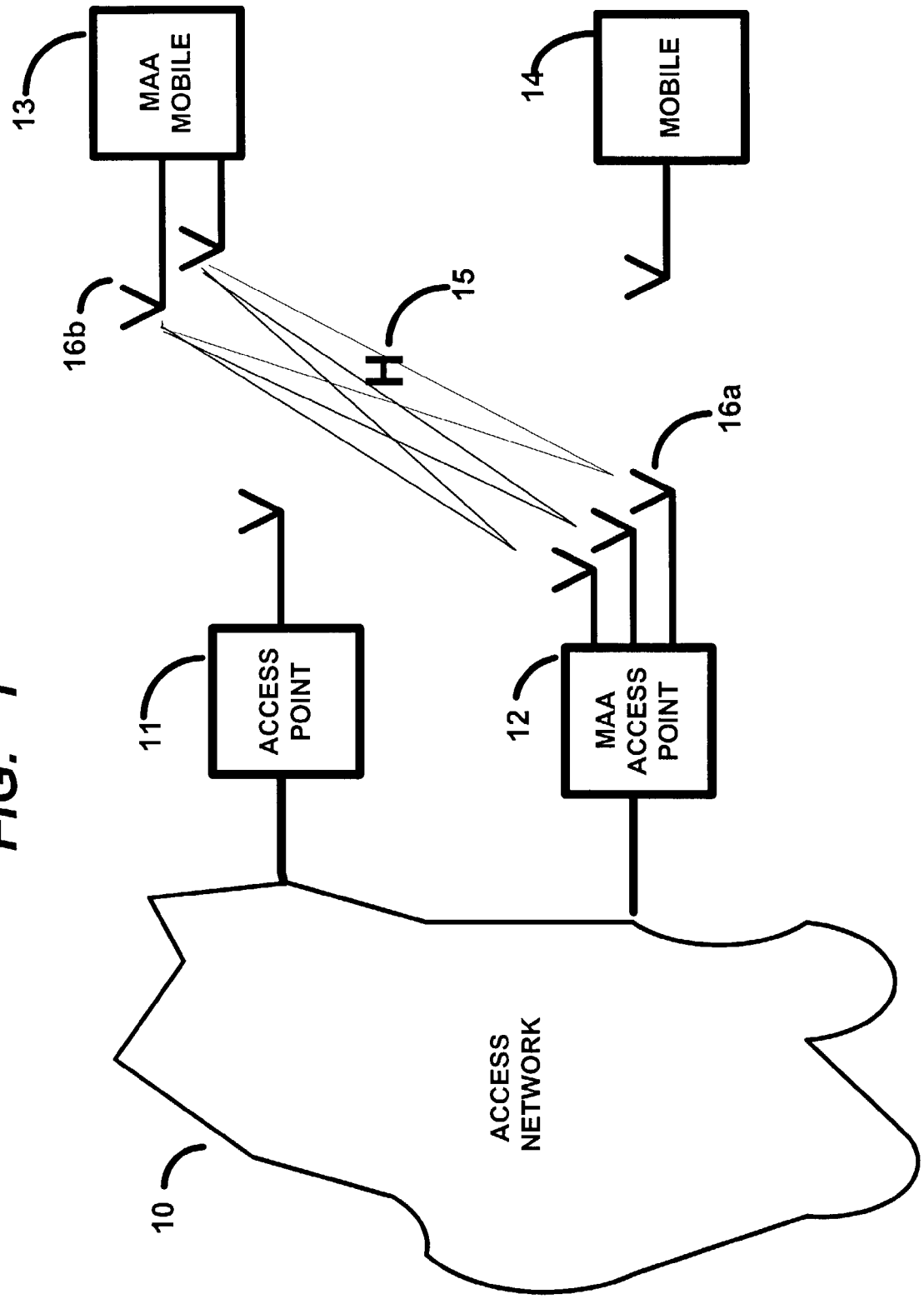
FIG. 1 describes a typical deployment scenario of a 2-way MIMO Wireless Communication Network.

A typical instance of a 2-way Wireless MIMO Network is shown in FIG. 1. According to the present invention such a Network should include at least 2 communication devices, such as 11, 12, 13, or 14, at least one of which should include a MIMO device such as those figuratively represented by 12 or 13. Typically (but not necessarily) a Wire-line access Network 10 (such as a Local Area Network, or a Wide Area Network, or 'the Internet', or a Cellular Network Backbone) will be connected to part of the wireless communication devices, such devices usually called Access Points (APs), or Base-Stations, examples of which, 11 and 12, are shown in FIG. 1.

Other wireless communication devices, such as 13 or 14, will stand alone, intercommunicating among themselves, or with the Wire-line Access Network 10, through APs 11 and 12. As further shown in FIG. 1 APs and Mobile Stations alike may comprise a Multi Antenna Array (MAA) 16 and its associated transmission, reception and processing circuitry, such as devices 12 (an AP) and 13 (a Mobile) in FIG. 1, while others, like 11 (an AP) and 14 (a Mobile) may consist of 'simple' non-MAA featured devices.

Between each and every pair of the MIMO Network communication devices a propagation Channel, such as 15, characterizing the propagation effects during signal transmission from 12 to 13 as shown in FIG. 1, may be defined. It should be noted that the propagation Channel characterizing signal transmission from 13 to 12, not shown in FIG. 1, may be identical to the characteristics of Channel 15 in the original direction (i.e. from 12 to 13), as is the case when signal transmission in both directions is executed over the same carrier frequency at slightly different times (as in a Time Division Duplex, TDD scheme), while in other cases, such as when signal transmission is carried on over different carrier frequencies in both directions (as in Frequency Division Duplex, FDD scheme), the Channel characteristics may differ.

The wireless Channel 15 between any two specified devices such as 12 and 13 of FIG. 1, in indoor and urban Network deployments, may typically be described by a complex random R×L matrix H, where R denotes the number of antennas in the Right side, MAA device 13, L denotes the number of antennas in the Left side, MAA device 12, and each element Hij in row i and column j of H defines the (complex base-band) response between reception antenna i of 13 and transmission antenna j of 12.

According to the present invention, H will be a complex scalar if both communication devices are of 'simple' non MAA featured type (such as 11 and 14 in FIG. 1); will be a one-dimensional vector if only one of the devices is MAA featured (such as the pair 11-13 in FIG. 1); and will be a 2-dimensional matrix when both communication devices are MAA featured (such as 12 and 13 in FIG. 1).

In an indoor or urban wireless Network deployment, due to the scattering nature of the propagation channel, the elements of the matrices H will typically (but not necessarily) be weakly mutually correlated random variables, provided that the Multi Antenna Array elements are properly spaced and designed. In a typical deployment of the proposed invention the Channel Matrix 15 will be quasi static and will only vary negligibly since the time the H estimates, or the information derived thereof, are made available at both Right and Left sides just prior to transmission start, and till the end of the transmission burst period.

Due to the Channel 15 signal attenuation and interference properties, to inherent physical limitations of the Receiving side components, to practical limitations in channel training stage duration, and to practical or regulatory limitations in transmission power the estimate of Channel 15 will be usually noisy, and will be thus denoted by Hn to distinguish it from the fore mentioned actual Channel Matrix H.

It will also generally be assumed along this invention description that immediately prior to said Channel Acquisition the processes of Carrier Frequency and Symbol Timing information estimation and extraction have been completed so that both Carrier Frequency and Symbol Timing are known, down to reasonable accuracy, to the Receiving side communication device.

Figure 2:
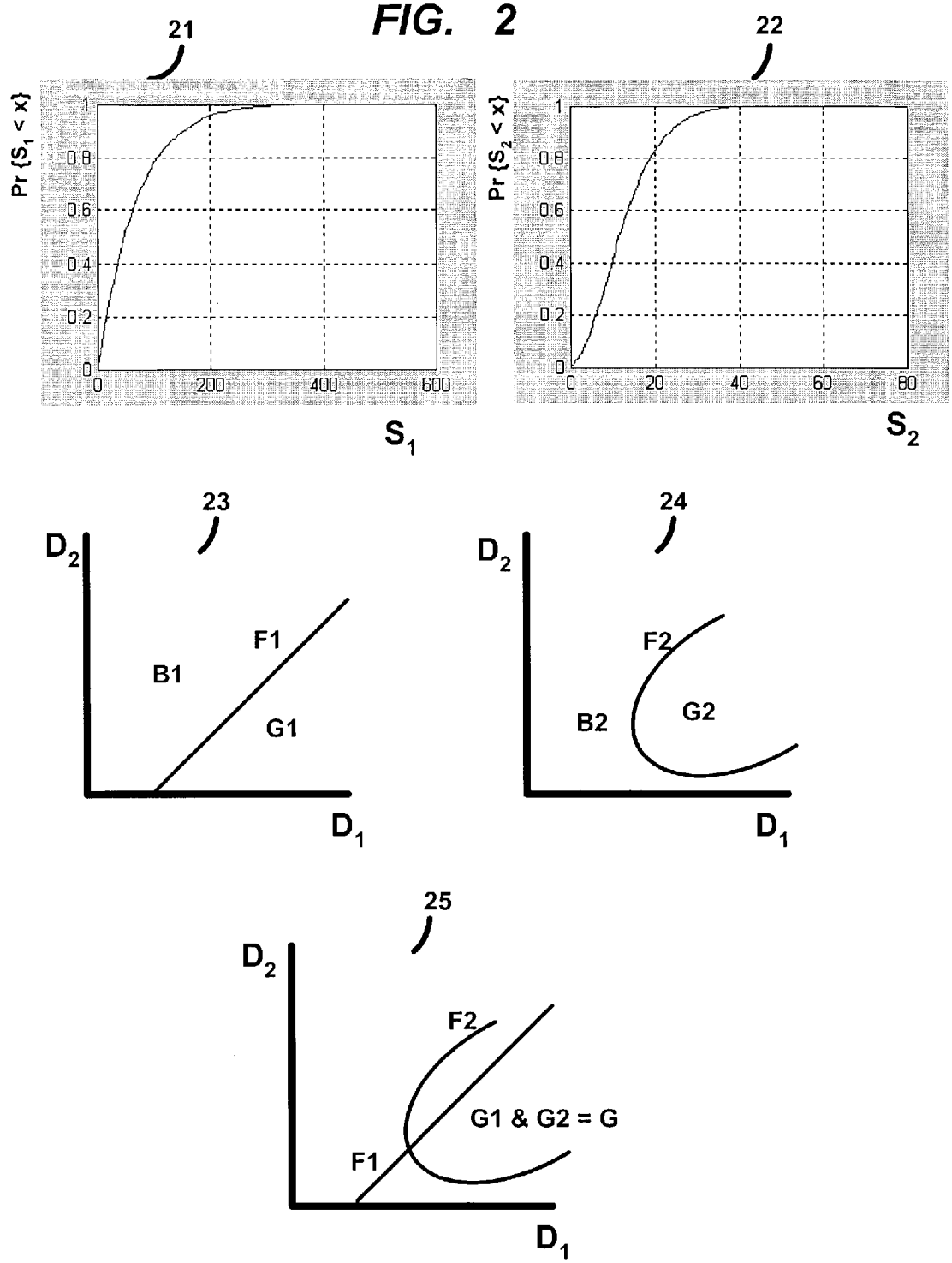
FIG. 2 provides some characterizations of user data sub-streams cross-talk performance of random Channel Matrices.

FIG. 2 provides, under the context of motivation, some random Channel Matrices characterization, essential to the exposition of the present invention. As result of the channel noisy estimate, degradation of the self-orthogonality property of U and V (the fore mentioned unitary matrices, outcomes of the SVD of H) takes place, and cross-talk noise power is induced at each of the user data vector elements $s_i$ by the other sub-streams vector elements $s_j$, $i \neq j$.

This cross-talk power limits the attainable Signal To Noise Ratio (SNR) at each of the user sub-streams. As it turns out to be, the vast majority of the (randomly picked) Channel Matrices H suffers from unacceptable cross-talk noise. To demonstrate this we associate with any realization of the random Channel Matrix H a Matrix Metrics Si, i=1, 2, ... M, M≦{L,R}, as follows:

$$Si = Si(H; \bar{\gamma}), \text{ so that } Pr\{xtlk\_SNR\_i > Si\} = T,$$
$$i = 1, 2, \ldots M$$

where $\bar{\gamma}$ is the mean channel SNR, and T is some appropriate demanding threshold (T=0.9 could be a typical value).

While the relation between the value of Si and an instance of the random Channel H is functionally deterministic, the Matrix Metrics Si, being a function of the Random Matrices H, are themselves random variables. The Cumulative Probability Density Function (cdf) of Si is shown in 21, 22 of FIG. 2, for i=1 and 2, L=R=3, $\bar{\gamma}$=20 db, and T=0.9. As evident from 21 and 22 of FIG. 2 not 'all matrices are born equal'; for example only a small portion (about 20%) of the whole population of H matrices maintain a cross-talk SNR_1>20 db, which is the minimum we would demand (in this example) in order not to cause our MIMO system to be cross-talk noise limited (rather than thermal noise limited).

It should be then clear by now, that plain and direct application of weight matrices Vn and Un in the Transmitting and Receiving sides respectively, will be practically useless under reasonable conditions of imperfect channel estimation.

As analyzed by Matrix Perturbation Theory (e.g. [7]) the magnitude of the orthogonality error is related to the norm of the perturbation matrix dH, as well as to certain relationships between the singular values Di of the matrix H, which are obviously a direct result of the specific instance of the random matrix H. Hence $Si = Si(H; \bar{\gamma}) = Si(D(H); \bar{\gamma})$ as is illustratively shown for example in 23 and 24 of FIG. 2 for $S_1$ and $S_2$ respectively, where, for simplicity only 2 dimensions, $D_1$ and $D_2$ are shown, and where the points to the right of the Discriminant Function (see e.g. [8]) $F_1(D_1, D_2; T_1) = 0$ in 23 (and the Discriminant Function $F_2(D_1, D_2; T_2) = 0$ in 24) define all the points in the Singular Values Feature Space spanned by $D_1 > 0$ and $D_2 > 0$ for which $S_1 > T_1$ in 23 of FIG. 2 (and $S_2 > T_2$ in 24 of FIG. 2), where $T_1$ and $T_2$ are properly defined real scalar thresholds.

Hence the set of all points $(D_1, D_2)$ in this Feature Space for which $F_1(D_1, D_2; T_1) \geq 0$ satisfy $S_1 \geq T_1$ and is denominated 'G1' in 23 ('G' for 'Good' in the sense that their corresponding Channel Matrices H have relatively high data sub-stream $s_1$ cross-talk SNR) and vice-versa, the set of all points $(D_1, D_2)$ in this Feature Space for which $F_1(D_1, D_2; T_2) < 0$ maintain $S_1 < T_1$ and is denominated 'B1' in 23 ('B' for 'Bad' in the sense that their corresponding Channel Matrices H have relatively low data sub-stream $s_1$ cross-talk SNR). Similarly, the set of all points $(D_1, D_2)$ in this Feature Space for which $F_2(D_1, D_2; T_2) \geq 0$ satisfy $S_2 \geq T_2$ and is denominated 'G2' in 24 and vice-versa, the set of all points $(D_1, D_2)$ in this Feature Space for which $F_2(D_1, D_2; T_2) < 0$ maintain $S_2 < T_2$ and is denominated 'B2' in 24 in said sense.

Generally stated, for i=1, 2, ... ,M $$F_i(D_1, D_2, \ldots D_M; T_i) \geq 0 \Leftrightarrow Si \geq T_i \Leftrightarrow D \in Gi \qquad \text{Predicate 1a}$$

$$F_i(D_1, D_2, \ldots D_M; T_i) < 0 \Leftrightarrow Si < T_i \Leftrightarrow D \in Bi \qquad \text{Predicate 1b}$$

It can be shown, for example for the L=R=3 case, that the Discriminant Function $F_1$ for $S_1$ can be approximated by a Hyper-plane as is illustrated in 23 of FIG. 2 i.e. $F_1(D_1, D_2, D_3; T_1) = a\,D_1 + b\,D_2 + c\,D_3 + d(T_1) = 0$, where a, b, c and d are constants. It can also be shown that the higher order Discriminant Functions, i.e. Fi $(D_1, D_2, D_3; T_i) = 0$, i=2,3 can be approximated by higher order polynomial Hyper-surfaces such as illustrated in 24 of FIG. 2 for $F_2$.

The specific functional and parametric description of said Hyper-surfaces for Fi, i=1, 2 . . . can be found by analytic or numeric methods by anyone skilled in the art and are non-essential to the present invention. Other equivalent representations of $S_i=S_i$ (D) are possible. For example, definition of a sequence of thresholds $T_1$ (and/or $T_2$), in-lieu of the for-mentioned single threshold(s) allows for the description of $S_1$ (D) (and/or $S_2$ (D)) by means of a sequence of 'iso-metrics' Hyper-surfaces. From this said sequence of iso-Metrics Hyper-surfaces an explicit approximated polynomial in D expression of $S_1$ (D) (and/or $S_2$ (D)) can be derived by application of e.g. standard curve fitting techniques by anyone skilled in the art.

Referring again to said Discriminant Functions representation, demanding of a Channel Matrix H (with its corresponding Singular Values Di, i=1,2, . . . ,M) the fulfillment of high cross-talk SNR for sub-streams $s_i$, i=1,2, . . . M (or a sub-set of said data sub-streams) is equivalent to demand that the Singular Values vector D of H belongs to the intersection of the corresponding sets G1, G2, etc, denoted 'G' in 25 of FIG. 2. Hence, the Singular Values of all the 'Good' matrices lie in the closed set $G=G_1 \cap G_2$ in 25. Since in a Wireless MIMO Communication System a randomly picked H has large probability of having bad cross-talk SNR for at least some of the user data sub-streams (as evident from 21 and 22 of FIG. 2) the ability to transform this Channel Matrix H into a modified Hm with better sub-streams cross-talk properties is desired and is an essential (but not sole) feature of this present invention.

This provides a primary motivation to modify the Channel Matrix as measured by the Transmitting and Receiving sides so that more favorable matrices are observed. According to the proposed invention, and as a result of the above exposed motivation sources, a Pre-Equalizer Matrix P, a modified Channel Matrix Hm, and several additional artifacts are introduced as described in the following paragraphs.

It should also be noted that different Matrix Metrics definitions than that given above as example are possible, such as the expected value of the cross-talk SNR, the median value of said cross-talk SNR, or others, the essential point in this invention being the creation of a function that relates some measure of the cross-talk SNR to the singular values of the Channel Matrix.

Figure 3:
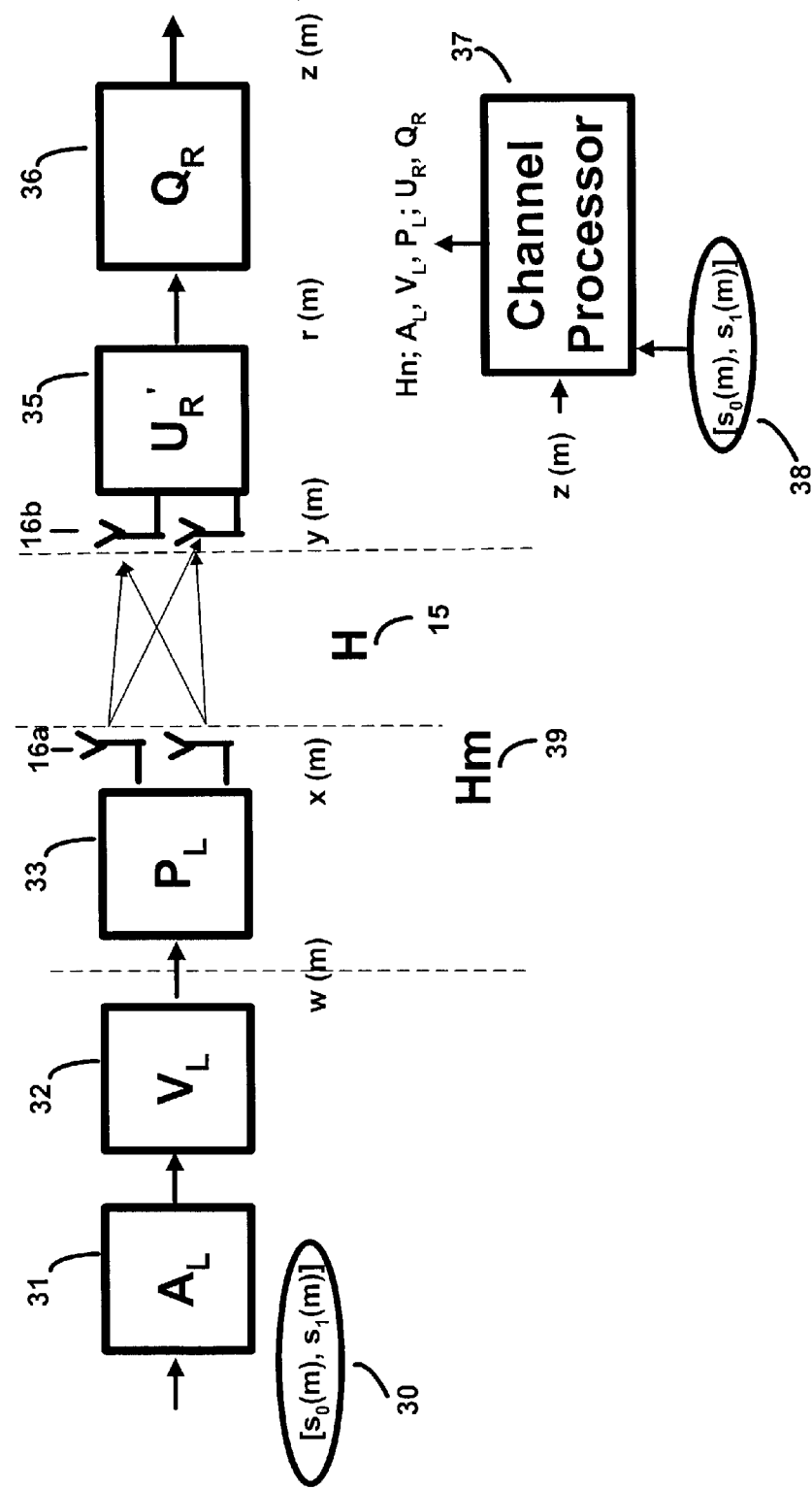
FIG. 3 presents a base-band block diagram of the Transmitter Segment of one MIMO Wireless Communication device and the Receiver Segment of another MIMO Wireless Communication device.

FIG. 3 presents a simplified Block Diagram of the Transmitter segment (30 to 33, 16a) of a Left side device and of the Receiver segment (16b, 35 to 38) of a Right side device. For the sake of simplicity the Left side device includes a Transmitter segment only and the Right side device includes a Receiver segment only, while it should be clear that in a 2-way wireless Communication System each side would typically include both a Transmitter and a Receiver segment.

While in the course of this invention description, by way of example, a MIMO scheme based on the execution of channel and symbol processing at the time domain will be generally assumed, it should be evident that this invention is directly applicable to other schemes as well such as wherein the MAA processing is executed at the frequency domain (such as in OFDM based systems, e.g. [4]).

Also, while in the course of this invention description, by way of example and for the sake of simplicity, a MIMO scheme will be generally assumed whereby all the Channel Processing including the estimation of the Channel Matrix Hn, the Singular Value Decomposition of Hn, the calculation of the Transmission Weighting Matrix V, the Pre-Equalizer Matrix P, the Power Allocation Matrix A, the Receiving Weighting Matrix U and the Post-Equalizer Matrix Q are carried out at the (say Right) Receiving side and the required operators, namely A, V and P are concurrently and implicitly transferred to the Transmitting (say Left) side by means of an implicit feed-back communication channel, such a scheme being typically (but not exclusively) characteristic of Frequency Division Duplex systems (FDD, whereby the forward and reverse links are maintained in different frequency channels), it should be readily understood that this invention is directly applicable to other schemes as well, such as wherein part of said matrices are calculated at one (say Right) side and other part on the other (say Left) side as may be typical of Time Division Duplex systems (TDD, whereby the forward and reverse links are carried over the same frequency channel and where advantage may be taken of the Channel Reciprocity Theorem).

FIG. 3 depicts, in matrix operator notation, the main invention relevant base-band elements of said communication devices while Radio Frequency circuitry, usually included in such Wireless Communication devices and several base-band operators and processes such as Radio Frequency Amplifiers, Mixers, Analog-To-Digital Converters, Time/Frequency Acquisition, Automatic Gain Control, etc. are omitted from FIG. 3 for the sake of brevity, being immaterial to the essence of the present invention.

In a possible embodiment of our proposed invention a pre-set and pre-stored vector finite sequence [$s_0$(m)], m=1, 2, . . . , aL, 30, is generated at the Left side device for purpose of the Channel Matrix estimation by the Right side device, where m denotes the (discrete) time index, L is the number of Left side Antenna Array 16a elements, and $a \geq 1$ is a constant the significance of which will be clarified later on.

This sequence can be better viewed as a matrix $S_0$ of dimension M×aL, where each matrix column is a vector $s_0$(m) of dimension $M \leq \min\{R,L\}$. In possible embodiments of this invention the vector sequence [$s_0$(m)] 30 is further processed, vector by vector, by a Power Allocation diagonal matrix $A_{L0}$, 31, of dimension M×M, by a typically unitary Weighting Matrix $V_{L0}$'32, of dimension M×L, and by a Pre-Equalizer Matrix $P_{L0}$, 33, resulting in a pre-set, MIMO Training Matrix (MTM) $X_0$ of dimension L×aL at the MAA 16a, the subscript '0' in $A_{L0}$, $V_{L0}$ and $P_{L0}$ denoting that these matrices carry at this (pre channel estimate) stage just the initial default values so as to transform $S_0$ into a desired $X_0$, and the subscript L denoting that these operators belong to the Left side.

The Transmitting device total transmitted power E[x(m)'x(m)], where E [.] denotes the expected value operator, is constrained to (say) unity by proper setting of the diagonal elements of $A_{L0}$, by keeping $V_{L0}$ unitary and by proper selection of $P_{L0}$; for example $A_{L0}=V_{L0}=P_{L0}=I$ (the identity matrix), so that $X_0=S_0$ will typically be suitable, so long as the constraint on total transmitted output power (E[x(m)'x(m)]=1) is maintained.

The generated matrix $X_0$ is then radiated, column after column, by means of the L elements of the Multi Antenna Array 16a, into a typically scattering channel 15, received by the Right side R elements of MAA 16b, corrupted by noise (usually assumed white, with Gaussian probability distribution), resulting in a finite discrete time vector sequence y(m), m=1,2, . . . ,aL, again better viewed as a matrix Y of dimension R×aL. This matrix Y is typically processed, column by column, by a pre-set unitary Weighting Matrix $U_{R0}$ 35 so that a recovered sequence r(m) results as described by Eq. 1 and 2 above, and further processed by a pre-set Post-Equalizer diagonal matrix $Q_{R0}$ 36.

Again, the fact that the operators 35, 36 carry initial default values at this stage, and that they are mainly shown for the sake of consistency with other, subsequent communication stages and clarity of description, is emphasized by the '0' subscripts; for example $U_{R0}=Q_{R0}=I$ so that $Z=Y$ will, here too, be typically suitable.

As described above, the channel 15 may be usefully perceived as a complex matrix H of dimension R×L, said matrix representing the (usually flat, frequency non-selective) fading response of the channel, the governing equation in this case being $$Z=Q_{R0}U_{R0}H\ P_{L0}V_{L0}'A_{L0}S_0+N \qquad \text{Eq. 3}$$

or, equivalently but in a simpler form, $$Y=HX_0+N \qquad \text{Eq. 4}$$

where N denotes the (usually white, complex Gaussian) receiving noise matrix of dimension R×aL, and our purpose being to estimate the Channel Matrix H given the pre-set, pre-stored transmitted matrix $S_0$ 20, 28 (or, equivalently $X_0$) and the received measured matrix Z (or, equivalently, Y), and to subsequently calculate the operators $A_L$, $V_L$, $P_L$, $U_R$, and $Q_R$ required by both devices for subsequent efficient user data transmission, as will be elaborated later.

For convenience it is beneficial to separate Eq. 4 into R separate canonical row vector equations $$[y(i,1)y(i,2)\ldots y(i,aL)]=[H(i,1)H(i,2)\ldots H(i,L)]X_0+[N(i,1)N(i,2)\ldots(i,aL)] \qquad \text{Eq. 5}$$

where i=1,2, . . . ,R, and the row vector [y (i,m)], m=1, 2, . . . ,aL contains, for each Right side MAA element 16b the received sequence of aL symbols after being transmitted and distorted by the channel row vector [H(i,j)], j=1,2, . . . , L and corrupted by the noise row vector [N(i,m)], m=1, 2, . . . ,aL.

This Channel initial Estimation (sometimes called Channel Acquisition) is carried out in the Channel Processor 37 by means of application of any suitable estimation technique (such as MLE, MMSE, LSE, etc, each optimal in some specified sense, see e.g. [6]), the selected technique itself being immaterial to the proposed invention. Taking the Least Squares Estimation (LSE) method as example, and assuming that the elements of the noise matrix N are independent and identically distributed (i.i.d.) Gaussian random variables, the Channel Matrix row vector estimates Hn(i) are $$Hn(i)=y(i)Cn^{-1}X_0'[X_0Cn^{-1}X_0']^{-1},\ i=1,2,\ldots R \qquad \text{Eq. 6}$$

where the 'n' subscript in Hn denotes the usually noisy nature of the H estimator and where Cn is the noise row vector N(i,m) Covariance Matrix (Cn=$\sigma^2$ I when N(i,m) elements are independent and identically distributed as is typically assumed).

The LSE estimation error, as reflected by its Covariance Matrix is in this case $$E[(H(i)-Hn(i))(H(i)-Hn(i))']=[X_0Cn^{-1}X_0']^{-1} \qquad \text{Eq. 7}$$

with i=1,2, . . . R.

It may be verified that the estimation error (Eq. 7) is minimal when the eigenvalues $\lambda i$ of $(X_0 X_0')$ satisfy $\lambda i=\lambda j=a$, and that the error is inversely proportional to aL i.e. to the number of transmitted symbols in the MIMO Training Matrix $X_0$ (or, equivalently in $S_0$) and to the noise variance $\sigma^2$.

It may also be verified that a sufficient condition for the existence of an estimate Hn is that the matrix $[X_0X_0']$ is not ill-conditioned, nor of course singular. An additional (usually regulatory) requirement on the columns of $X_0$ would typically be the constraint on the overall (say unity) transmitted power, that is the requirement that trace $(X_0'X_0)$=aL.

Finally, according to this said possible embodiment of our proposed invention, Equation 6, which represents the first of the main processing results of the proposed Channel Processor 37, may be written and executed in a more concise matrix form as $$Hn=Y\ Cn^{-1}X_0'[X_0Cn^{-1}X_0']^{-1} \qquad \text{Eq. 8}$$

where it is evident that the product $Cn^{-1}X_0'[X_0Cn^{-1}X_0']^{-1}$ (or equivalently $S_0'[S_0S_0']^{-1}$) can be pre-calculated and pre-stored inside 38 of FIG. 3 so that upon reception of the measurement matrix Y (or, equivalently, Z), a simple matrix multiplication is executed by means of circuitry (or software) immaterial to the invention itself and which may be implemented by a variety of techniques well known to those ordinarily skilled in the art. It should also be noted that if a<1 then $[X_0\ Cn^{-1}\ X_0']$ is not of full rank and its inverse does not exist, hence the requirement for $a\geq 1$.

In further accordance with one possible embodiment of the present invention, following the estimation of Hn as described above, the Right side device may proceed to calculate $P_L$ by means of (Singular Value) Decomposition of Hn=Un Dn Vn' and evaluation of the Discriminant Functions Fi, i=1,2, . . . M as specified and described by Predicate 1 in the context of FIG. 2 above.

If Fi$\geq$0 for all user data sub-streams of interest, as will be rarely the case (given the probabilities exposed during FIG. 2 description), then our Channel Matrix Hn is 'Good' and we may set $P_L$=I so that our modified Channel Matrix Hm, 39 of FIG. 3, will remain Hm=HP$_L$=H. If Fi<0 for at least some of the sub-streams $s_i$ of interest, as will be usually the case, we should transform our 'Bad' H into a 'Good' Hm by the application of a Pre-Equalizer operator $P_L$ which should be calculated so that the modified Channel Matrix Hm, 39, enjoy Singular Values Dm which reside in the 'G' closed set (as defined for the data sub-streams and corresponding Discriminant Functions of interest).

It can be shown that the best Pre-Equalizer (in the sense of SNR maximization) should yield Singular Values Dm (of the modified Channel Matrix Hm, 39) which solve the constrained functional minimization problem $$\min_{Dm} \beta(D_m; D_n) = \min_{Dm} \text{trace}(P_L P_L') = \min_{Dm} \sum_i (Dmi/Dni)^2 \qquad \text{Eq. 9a}$$

subject to the constraint $$Dm \in G = \bigcap_i G_i \qquad \text{Eq. 9b}$$

where Dmi are the Singular Values vector components of the modified Channel Hm, Dni are the Singular Values vector components of the Channel Matrix Hn, G is the closed set of Dm which correspond to 'Good' Channel Matrices as described above in the context of FIG. 2, and the index i runs across the set of desired sub-streams (i$\leq$M).

Equation 9 represents a constrained minimization problem which can be solved and implemented by a variety of methods well known to those skilled in the art, the specific method of solution and implementation being immaterial to the essence of this present invention. Inspection of Eq. 9a reveals that the minimization of the functional β is equivalent to the minimization of the norm of the vector Dm, when this norm is calibrated by the components of our original Channel Matrix estimate Singular Values vector Dn, that is the solution Dm is, in a certain sense, the 'minimum size' Dm vector.

It can also be shown that, since the Pre-Equalizer operator P is located at the Transmitter side, the functional β represents actually the power attenuation factor by which the data user vector s has to be attenuated in order to compensate for the 'gain' provided by the Pre-Equalizer P and maintain the constraint of unity overall transmitted power; in this case β represents the user data signal SNR loss due to our utilization of the modified Channel Hm, 39.

If this SNR loss becomes too high (β>>1) then one or more sub-streams (usually with the highest index i) may be given up which weakens the constraint of Eq. 9b and reduces the resulting minimal value of β and the corresponding for-mentioned SNR loss. Giving up all the sub-streams $s_i$ except the first (i.e. $s_1$) returns the MIMO system operation to plain coherent diversity mode, where it enjoys from both diversity and Multiple Antenna Array gains.

According to the present invention, after having computed the optimal Dm by the process outlined above, the Pre-Equalizer $P_L$ and the corresponding Transmitting and Receiving Weighting Matrices may be immediately calculated by $$P_L = Vn\ Dn^{-1} Dm \qquad \text{Eq. 10a}$$

where Vn and Dn are the results of the Singular Value Decomposition of our original Channel Matrix estimate Hn (Hn=Un Dn Vn') and where a pseudo-inverse of Dn may be used in those cases where $Dn^{-1}$ is not defined; it can be immediately verified that the Singular Values of the modified channel ($HnP_L$=Un Dn Vn'Vn $Dn^{-1}$ Dm=Un Dm I) indeed are the 'Good' Dm as required, and that $$U_R = Un \qquad \text{Eq. 10b}$$

and $$V_L = I \qquad \text{Eq. 10c}$$

Finally, the Power Allocation Matrix $A_L$, 31, may be calculated so that the total transmitted power constraint (to, say, unity) is satisfied. In the simple case, brought herein for illustration only and without affecting the generality of the present invention, whereby equal power is allocated to each sub-stream vector component it can be readily seen that $$A_L = (1/\sqrt{\beta})I \qquad \text{Eq. 10d}$$

It is readily recognized that the operations described by Eq. 10 consist of matrix multiplications, transpositions and inversions, such operations being easily implemented by those skilled in the art by either dedicated circuitry or software.

As mentioned above, other strategies and their corresponding invention embodiments can be applied for the specification and calculation of the modified Channel Matrix Hm and its associated Singular Value Matrix Dm and Pre-Equalizer P. According to another such possible embodiment of the present invention the modified channel singular values matrix Dm can be found by maximization of a functional consisting of some weighted sum of the net total SNR gains of the different sub-streams, said net SNR gains being the result of the channel modification, for example $$\min_{D_m} \sum_i a_i \cdot \log(\rho_i(D_m; \bar{\gamma})/(\rho_i(D_n; \bar{\gamma}) \cdot \beta(D_m, D_n))) \qquad \text{Eq. 11}$$

subject to $$D_{m1} \geq D_{m2} \geq \ldots \geq D_{mM} \geq \qquad \text{Eq. 11a}$$

where the total sub-stream SNR $\rho_i$ is defined as the SNR with both cross-talk and receiver (thermal) noise included, where, again, $\bar{\gamma}$ is the mean channel SNR, where $\alpha_i \geq 0$ are some suitably defined scalar weighting factors, and where the Pre-Equalizer loss β(Dm,Dn) is defined as above. Said total sub-stream SNR $\rho_i$ may be calculated by anyone skilled in the art, since its components, namely the received sub-stream signal power, the cross-talk noise power, and the thermal noise power are readily computable.

Following said optimization the Pre-Equalizer $P_L$, the Weighting Matrices $U_R$ and $V_L$ and the Power Allocation Matrix $A_L$ can be calculated by application of Equations 10a,b,c,d as above.

Still other embodiments of the present invention are possible in the context of the calculation of the singular values Dm of the modified channel, according to suitable and different to be optimized functional formulations, the general essential points being the definition of a Matrix Metrics which associates some measure of the sub-streams cross-talk SNR to the singular values of a channel matrix, and the solution of said functional optimization problem, followed by the calculation of the Pre-Equalizer, Transmitting and Receiving Weighting Matrices and Power Allocation Matrix.

We have shown so far how, in conformance with this present invention, after having the Left side device transmitted a MIMO Training Matrix $S_0$, most necessary channel information required for proper and efficient user data transmission is acquired and calculated.

As mentioned above, the required parts of this information (namely $A_L$, $V_L$ and $P_L$) may be subsequently transferred to the Left side device by means of a reverse channel, or, as would typically (but not necessarily) be the case in TDD based systems, another similar MTM $S_0$ could be transmitted, this time from the Right side device to the Left side device for the purpose of said information calculation.

In further accordance with the proposed invention, after having calculated the for-mentioned operators, and after having replaced their for-mentioned initial values with the results of this calculation, at both the Transmitting (say Left) and Receiving (say Right) sides, a pre-set and pre-stored vector finite sequence $[s_1(m)]$, m=1,2, . . . ,bM, 30, where $b \geq 1$ is a (typically integer) constant, the significance of which will be clarified later on and M is, as before, the number of separate user data sub-streams (M≤min{R, L}), is generated at the Transmitter (say) Left side device for purpose of the calculation of the Post-Equalizer $Q_R$, 36, by the Receiving (say) Right side device.

In a possible embodiment of this invention, easier to explain and understand, this sequence can be better viewed as a sequence of b concatenated diagonal matrices $S_1$, each of dimension M×M. The $S_1$ MTM concatenated matrix is then processed, column after column, by the operators 31, 32, 33 so that a transmitted waveform x(m) is generated and radiated by the MAA elements 16a according to:

$$x(m) = P_L V_L A_L s_1(m) \qquad \text{Eq. 12}$$

where m=1,2, . . . ,bM, and where x(m) is constrained again, as required, to (say) unity output total power by proper value assignment to the Power Allocation Matrix $A_L$ 31.

These transmitted column vectors are affected by the propagation channel H 15, and received by the MAA elements 16b of the Receiving (Right side) device, so that $$y(m) = Hx(m) = (H\ P_L)V_L\ A_L s_1(m) =$$
$$= Hm\ V_L\ A_L\ s_1(m)$$
Eq. 13 where m=1,2, . . . ,M and where (thermal) receiving side noise is omitted for simplicity.

The received waveform vector r(m) will now be $$r(m) = U_R\ `y(m) = U_R`Hm\ V_L\ A_L s_1(m) =$$
$$= (U_R`Um)\ Dm\ (Vm`V_L)\ A_L s_1(m)$$
Eq. 14 with n=1,2, . . . ,M.

Since the unitary matrices $U_R'$ and Um (and $V_L$ and Vm' for the same purpose) are derived from slightly different versions of matrices (namely Hn and H correspondingly) their product does not exactly equal the identity matrix I. In particular the off-diagonal elements of said product matrices do not equal zero (as would be the case with perfect channel estimation) and thus, as was extensively elaborated above, cross-talk noise between the several user data sub-streams $s_i$ result, the impact of which may be significantly ameliorated when applying the novel concept of the Pre-Equalizer matrix P as proposed above in the context of this invention.

Due to the estimation noise affecting $U_R$ and $V_L$ the diagonal elements of said products however, are themselves each a complex scalar (usually close to but not equal to 1), so that the sub-streams $s_i$ are, separately each, magnitude and phase distorted. According to the proposed invention, by utilizing the (possibly b times concatenated) for-mentioned diagonal matrix $S_1$, the Channel Processor 37 calculates a Post-Equalizer diagonal Matrix $Q_R$, 36, which after substituting the default initial value $Q_{R0}$ in the Post-Equalizer 36, is able to correct said magnitude and phase distortion at each sub-stream, significantly enhancing the received SNR at the received vector z(m).

For the simple case where b=1, a single diagonal matrix $S_1$ of dimension M×M is used, and denoting its diagonal elements by $S_1(i, m)$, i=m=1,2, . . . ,M, the Post-Equalizer diagonal Matrix corresponding elements $Q_R(i, m)$ take the form $$Q_R(i,m) = S_1(i,m)/r(i,m)$$
Eq. 15 for i=m=1,2, . . . ,M, the calculation of which may be implemented by a variety of techniques well known to those ordinarily skilled in the art.

In analogy with the $S_0$ MTM training case described above, using a longer $S_1$ MTM (b>1) results in lower $Q_R$ estimation error at the expense of increased channel usage overhead. It is also worthwhile to note that, for effective actual implementation, the operators $Q_R$ and $U_R$ (as well as $P_L$ and $V_L$) may be combined, after having been calculated by the Channel Processor 37, into a single (hardware or software based) operation, for complexity reduction.

Having completed the calculation of the Post-Equalizer Matrix $Q_R$, 36, its value replaces the for-mentioned initial value $Q_{R0}$, the Training/Acquisition Stage is terminated, and the Left and Right sides MIMO Wireless Communication devices may proceed, according to the present invention, to multi sub-stream user data transmission.

Figure 4:
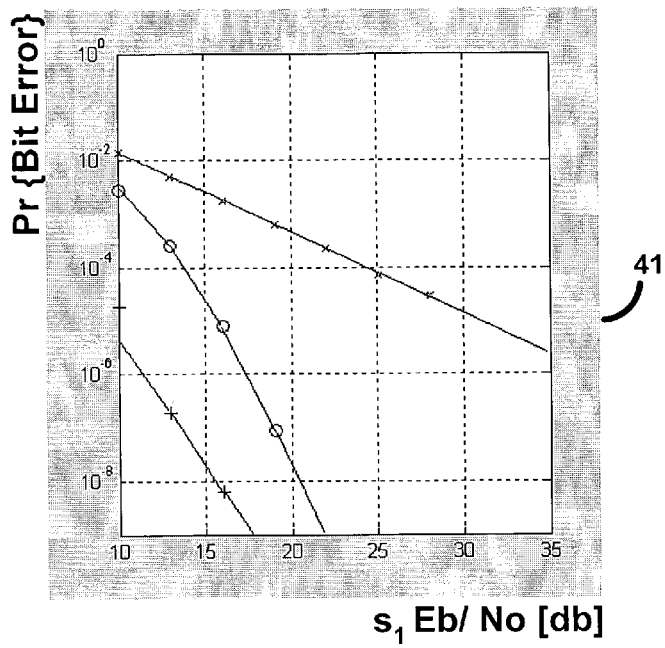
FIG. 4 shows simulated Bit Error Rate (BER) vs. Eb/No performance results of a particular embodiment of the present invention
Figure 4:
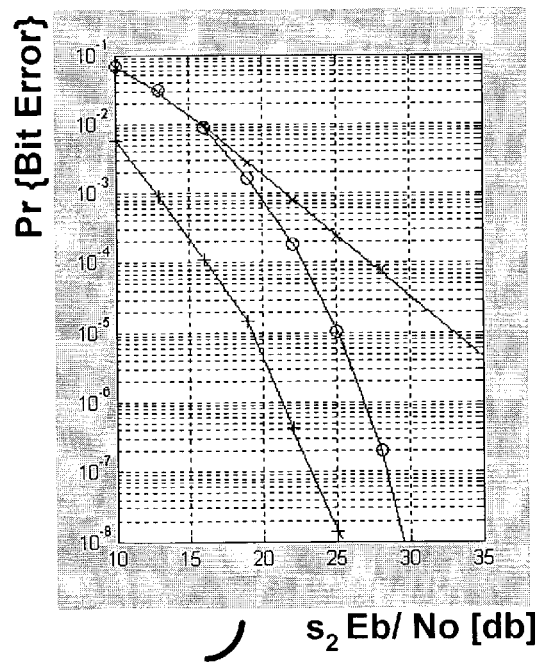
Figure 4:
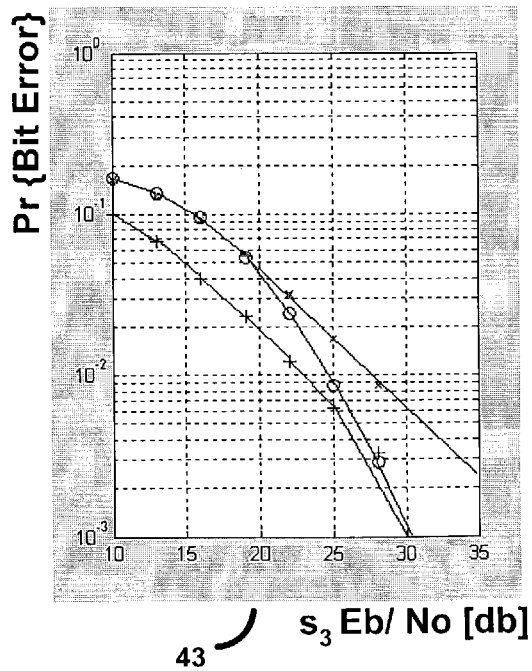

FIG. 4 presents BER vs. Eb/No comparative plots, 41, 42, and 43 of the simulated performance of a MIMO system, with L=R=3, a=b=1, and QPSK modulation for s1, s2 and s3 sub-streams respectively. The lower left (best, denoted by '+') curves on each plot 41, 42 and 43 are based on an 'ideal' MIMO model (no channel estimate error, no cross-talk interference, no artifacts), the center (better, denoted by 'o') curves are based on the principles exposed in this invention (imperfect channel estimate, cross-talk interference, with artifacts), and the upper right (worst, denoted by 'x') curves represent simulation results for a 'naïve' MIMO system (imperfect channel estimate, cross-talk interference, no artifacts) such as in [3].

Inspecting, as a matter of example, the center curve of 41 of FIG. 4, it can be noticed that a performance gain of approximately 20 db (at 10E-6 BER) with regards to the performance of a 'naïve' MIMO system such as [3] is achieved, while a performance gap of about 5 db (at same 10E-6 BER) remains between this and an 'ideal' MIMO system.

It should be finally noted that the cross-talk SNR and Singular Values analysis on which this invention is based, is fundamentally different than other well known techniques, such as for-mentioned Adaptive Modulation ([10]) and Sequential Interference Cancellation ([1], [2]); this fundamental difference allows in principle the superposition of such techniques, on top of the techniques of the present invention, to possibly further enhance performance.

The principles on which this invention is based are further described in great detail and appropriate language in [11].

What is claimed is:

1. A method for evaluating a channel of a multiple-input multiple-output (MIMO) wireless communication system, wherein said communication system comprises at least two communication devices having a plurality of radiating elements for the parallel transmission of data sub-streams, comprising:

defining a channel matrix metric, said channel matrix metric comprising a respective predefined function of channel matrix singular values for each of said data sub-streams, such that each of said predefined functions provides a measure of cross-talk signal to noise ratio (SNR) for said respective sub-stream;

obtaining an estimated channel matrix;

performing a singular value decomposition (SVD) of said estimated channel matrix to obtain estimated channel singular values, said singular value decomposition comprising a left-hand unitary weighting matrix, a diagonal matrix of said estimated channel singular values, and a right-hand unitary weighting matrix; and calculating a respective crosstalk measure for each of said sub-streams from said channel matrix metric and said estimated channel singular values.

2. A method according to claim 1, wherein each of said functions maps said channel singular values onto an expected value of said cross-talk SNR of said respective sub-stream.

3. A method according to claim 1, wherein each of said functions maps said channel singular values onto a median value of said cross-talk SNR of said respective sub-stream.

4. A method according to claim 1, wherein each of said functions maps said channel singular values onto a value such that a probability of a channel cross-talk SNR of said respective sub-stream being greater than said value equals a pre-determined threshold.

5. A method according to claim 4, further comprising approximating said predefined functions as iso-valued polynomial surface functions of channel singular values, wherein each of said iso-valued surfaces divides the linear space defined by said singular values into a respective two partitions.

6. A method according to claim 1, further comprising determining the necessity of a pre-equalizer matrix from said calculated crosstalk measures.

7. A method according to claim 5, further comprising deriving a pre-equalizer matrix so as to yield a modified channel matrix having singular values within an intersection of said partitions, wherein said modified channel matrix comprises said estimated channel matrix pre-multiplied by said pre-equalizer matrix.

8. A method according to claim 7, wherein said intersection of partitions comprises a set of singular values such that the value of each of said iso-valued polynomial surface functions, evaluated at any point within said set of singular values, is no less than zero.

9. A method according to claim 7, wherein said deriving comprises:
providing a desired set of singular values of said modified channel matrix, wherein said set of singular values lies within said intersection of partitions;
forming a diagonal matrix of said desired singular values; and
performing a matrix multiplication of said right hand unitary weighting matrix, an inverse of said diagonal matrix of said estimated channel singular values, and said diagonal matrix of said desired singular values.

10. A method according to claim 1, further comprising deriving a pre-equalizer matrix from said matrix metric so as to yield a modified channel matrix having singular values Which maximize a weighted sum of net total SNR gains of said sub-streams, wherein said modified channel matrix comprises said estimated channel matrix pre-multiplied by said pre-equalizer matrix.

11. A method according to claim 1, further comprising deriving a pre-equalizer matrix from said matrix metric so as to yield a modified channel matrix with improved crosstalk measures, wherein said modified channel matrix comprises said estimated channel matrix pre-multiplied by said pre-equalizer matrix.

12. A method according to claim 11, further comprising calculating a diagonal power allocation matrix for allocating radiated transmission power such that a total prescribed maximum transmission power is preserved.

13. A method according to claim 12, wherein the diagonal elements of said diagonal power allocation matrix are equal.

14. A method according to claim 12, wherein the diagonal elements of said diagonal power allocation matrix are proportional to respective channel matrix singular values.

15. A method according to claim 12, wherein said pre-equalizer matrix and said power allocation matrix are calculated so as to obtain cross-talk SNRs not less than specified thresholds, and so as to minimize a resultant SNR loss from the application of said power allocation matrix.

16. A method according to claim 15, further comprising setting said pre-equalizer matrix to an identity matrix if an SNR loss resultant from said pre-equalizer matrix exceeds a specified threshold.

17. A method according to claim 10, further comprising setting said pre-equalizer matrix to an identity matrix if a net total SNR gain resultant from said pre-equalizer matrix is smaller than unity.

18. A method according to claim 11, further comprising defining a post-equalizer matrix by performing the steps of:
transmitting a training sequence over a wireless communication channel, said training sequence comprising a predefined data sequence multiplied by said pre-equalizer matrix prior to transmission;
receiving said transmitted data sequence;
multiplying said received data sequence by a complex transpose of said left-hand unitary weighting matrix to form a weighted received data signal;
for each data sub-stream, calculating a ratio of a transmitted data signal and a weighted received data signal; and
forming a diagonal matrix of said calculated ratios.

19. A method according to claim 1, wherein processing of said MIMO communication is performed in the time-domain.

20. A method according to claim 1, wherein processing of said MIMO communication is performed in the frequency-domain.

21. A method for communicating digital data over a MIMO wireless communication system, wherein said communication system comprises at least two communication devices having a plurality of radiating elements for the parallel transmission of data sub-streams, comprising:
obtaining an estimated channel matrix;
multiplying said data sub-streams by a unitary transmission weighting matrix to form a weighted data stream, wherein said transmission weighting matrix comprises a conjugate transpose of a right-hand unitary matrix of a singular value decomposition of an estimated channel matrix, and wherein said singular value decomposition comprises a left-hand unitary weighting matrix, a diagonal matrix of said estimated channel singular values and a right-hand unitary weighting matrix;
multiplying said weighted data stream by a pre-equalizer matrix to form a pre-equalizer data stream, said pre-equalizer matrix being determined by the steps of:
defining a matrix metric, said channel matrix metric comprising a respective predefined function of channel matrix singular values, for each of said data sub-streams, such that each of said predefined functions provides a measure of cross-talk signal to noise ratio (SNR) for said respective sub-stream;
calculating a respective crosstalk measure for each of said sub-streams from said channel matrix metric and said estimated channel singular values; and
calculating said pre-equalizer matrix so as to yield a modified channel matrix having improved crosstalk measures, wherein said modified channel matrix comprises said estimated channel matrix pre-multiplied by said pre-equalizer matrix;
and
transmitting said pre-equalized data stream.

22. A method according to claim 21, further comprising pre-multiplying said data sub-streams by a diagonal power allocation matrix, such that a total prescribed maximum transmission power is preserved.

23. A method according to claim 21, reducing a number of transmitted data sub-streams if an SNR loss resultant from said pre-equalizer matrix exceeds a specified threshold.

24. A method according to claim 21, reducing a number of transmitted data sub-streams if a net total SNR gain resultant from said pre-equalizer matrix is smaller than unity.

25. A method according to claim 21, further comprising approximating said predefined functions as iso-valued polynomial surface functions of channel singular values, wherein each of said iso-valued surfaces divides the linear space defined by said singular values into a respective two partitions, and wherein said modified channel matrix is calculated to have singular values within an intersection of said partitions.

26. A method according to claim 21, wherein said modified channel matrix is calculated to have singular values which maximize a weighted sum of net total SNR gains of said sub-streams.

27. A method according to claim 21, further comprising:
receiving said transmitted data;
multiplying received data sub-streams by a reception weighting matrix to form a weighted received data stream, wherein said reception weighting matrix comprises a complex conjugate transpose of said left-hand unitary weighting matrix of said estimated channel matrix; and
multiplying said weighted received data sub-streams by a post-equalizer matrix, said post-equalizer matrix being determined by the steps of:
transmitting a training sequence over a wireless communication channel, said training sequence comprising a predefined data sequence multiplied by said pre-equalizer matrix and said right-hand unitary matrix prior to transmission;
receiving said transmitted data signal;
multiplying said received data sequence by said reception weighting matrix to form a weighted received data signal;
for each data sub-stream, calculating a ratio of a transmitted data signal and a weighted received data signal; and
forming a diagonal matrix of said calculated ratios.

28. A transmission apparatus for evaluating a channel of a MIMO wireless communication system, wherein said communication system comprises at least two communication devices having a plurality of radiating elements for the parallel transmission of data sub-streams, comprising:
an SVD performer, configured for performing an SVD of an estimated channel matrix to obtain estimated channel singular values, said singular value decomposition comprising a left-hand unitary weighting matrix, a diagonal matrix of said estimated channel singular values and a right-hand unitary weighting matrix; and
a measure calculator associated with said SVD performer, configured for calculating a respective crosstalk measure for each of said sub-streams from said estimated channel singular values and a channel matrix metric, said channel matrix metric comprising a respective predefined function of channel matrix singular values for each of said data sub-streams, such that each of said predefined functions provides a measure of cross-talk signal to noise ratio (SNR) for said respective sub-stream.

29. An apparatus according to claim 28, wherein each of said functions maps said channel singular values onto an expected value of said cross-talk SNR of said respective sub-stream.

30. An apparatus according to claim 28, wherein each of said functions maps said channel singular values onto a median value of said cross-talk SNR of said respective sub-stream.

31. An apparatus according to claim 28, wherein each of said functions maps said channel singular values onto a value such that a probability of a channel cross-talk SNR of said respective sub-stream being greater than said value equals a pre-determined threshold.

32. An apparatus according to claim 28, wherein said predefined functions are approximated by iso-valued polynomial surface functions of channel singular values.

33. An apparatus according to claim 28, further comprising a pre-equalizer matrix deriver configured for deriving a pre-equalizer matrix so as to yield a modified channel matrix having improved crosstalk measures, wherein said modified channel matrix comprises said estimated channel matrix pre-multiplied by said pre-equalizer matrix.

34. An apparatus according to claim 33, wherein said pre-equalizer matrix is calculated so as to yield a modified channel matrix having singular values which maximize a weighted sum of net total SNR gains of said sub-streams.

35. An apparatus according to claim 33, wherein said pre-equalizer matrix is calculated so as to yield a modified channel matrix having singular values within an intersection of partitions of the linear space defined by said singular values, and wherein said partitions are created by iso-valued polynomial surface functions of channel singular values which approximate said predefined functions.

36. An apparatus according to claim 33, wherein said pre-equalizer matrix deriver is configured to derive said pre-equalizer matrix from a provided set of desired singular values of said modified channel matrix by performing a matrix multiplication of said right-hand unitary weighting matrix, an inverse of said diagonal matrix of said estimated channel singular values, and a diagonal matrix of said desired singular values.

37. An apparatus according to claim 33, further comprising a power allocation matrix deriver configured for calculating a diagonal power allocation matrix for allocating radiated transmission power such that a total prescribed maximum transmission power is preserved.

38. An apparatus according to claim 37, wherein said pre-equalizer matrix and said power allocation matrix are calculated so as to obtain cross-talk SNRs not less than specified thresholds, and so as to minimize a resultant SNR loss from the application of said pre-equalizer matrix and said power allocation matrix.

39. A transmitter for a MIMO wireless communication system comprising the apparatus of claim 33, and further comprising:
a transmission weighting matrix comprising said right-hand unitary weighting matrix, configured for multiplying a transmit data vector to form weighted data sub-streams; and
said pre-equalizer matrix being configured for multiplying said weighted data sub-streams to form a pre-equalized data stream for transmission.

40. The transmitter of claim 39, further comprising a diagonal power allocation matrix configured for allocating radiated transmission power between said sub-streams such that a total prescribed maximum transmission power is preserved.

41. A reception apparatus for a MIMO wireless communication system, wherein said communication system comprises at least two communication devices having a plurality of radiating elements for the parallel transmission of data sub-streams, comprising:

an SVD performer, configured for performing an SVD of an estimated channel matrix to obtain estimated channel singular values, said singular value decomposition comprising a left-hand unitary weighting matrix, a diagonal matrix of said estimated channel singular values and a right-hand unitary weighting matrix;

a post-equalizer matrix deriver configured for defining a post-equalizer matrix by receiving a training sequence transmitted over a wireless communication channel, multiplying said received data sequence by a complex transpose of said left-hand unitary weighting matrix to form a weighted received data signal, calculating, respectively for each data sub-stream, a ratio of a transmitted data signal and a received data signal, and forming a diagonal matrix of said calculated ratios;

a reception weighting matrix comprising a complex conjugate transpose of said right-hand unitary weighting matrix, configured for multiplying received data sub-streams to form weighted received data sub-streams; and said post-equalizer matrix associated with said post-equalizer deriver and said reception weighting matrix, configured for multiplying weighted received data sub-streams to form a received data vector.

* * * * *